Figure 1:
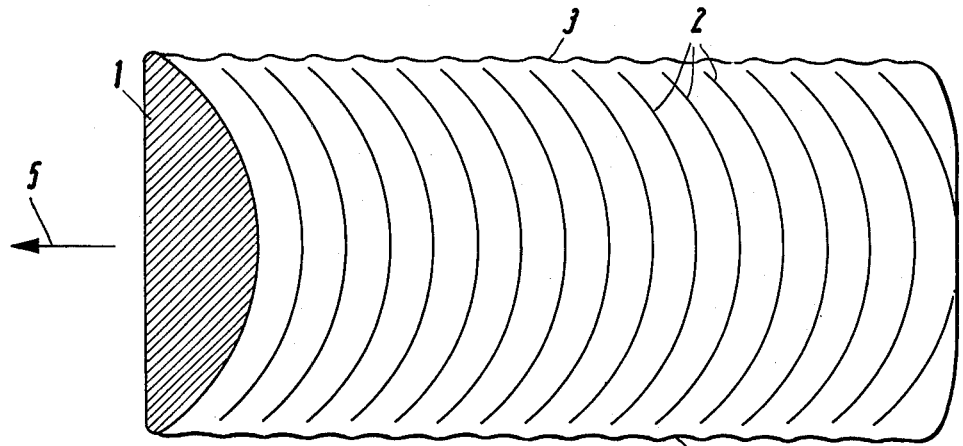

United States Patent

Neff et al.

[11] 3,882,298
[45] May 6, 1975

[54] METHOD OF AND APPARATUS FOR THE SUBMERGED ARC SURFACING OF METALLIC WORK PIECES

[75] Inventors: Franz Neff; Hermann Ornig, both of Kapfenberg, Austria

[73] Assignee: Gebr. Boehler & Co., Vienna, Austria

[22] Filed: Apr. 13, 1973

[21] Appl. No.: 351,122

[30] Foreign Application Priority Data
Apr. 14, 1972 Austria .......................... 2218078/72

[52] U.S. Cl. .................................. 219/76; 219/123
[51] Int. Cl. .............................................. B23k 9/08
[58] Field of Search ................ 219/73, 76, 123, 137

[56] References Cited
UNITED STATES PATENTS
3,130,294   4/1964   Regnauld ............................ 219/123
3,584,181   6/1971   Nemoto et al. ................. 219/123 X
FOREIGN PATENTS OR APPLICATIONS
43-27942   2/1968   Japan ................................. 219/123

OTHER PUBLICATIONS
Holt, R. W., "Methods of Controlling Arc Blow," The Welding Engineer, April, 1932, pp. 44–46.

Primary Examiner—J. V. Truhe
Assistant Examiner—N. D. Herkamp

[57] ABSTRACT

Method of and apparatus for the submerged arc surfacing of metallic work pieces with metal strips melting in an electric arc while forming welding beads of more than 75 mm in width. The strip electrode is connected to the pole of a direct-current source; during the melting process the electrode is accompanied by a stationary magnetic field. By means of such magnetic field in the region of the edge zones of the strip electrode the carriers of positive charges in the arc are deflected toward the direction of welding travel so as to slope outwards, said edge zones being approximately one-twentieth to one-fourth of the strip electrode width. By use of the invention the width of the surfacing layer is increased by 2 to 15 mm, as compared with the bead width obtained with apparatus in which no influence upon the arc is exerted by the magnetic field.

7 Claims, 5 Drawing Figures

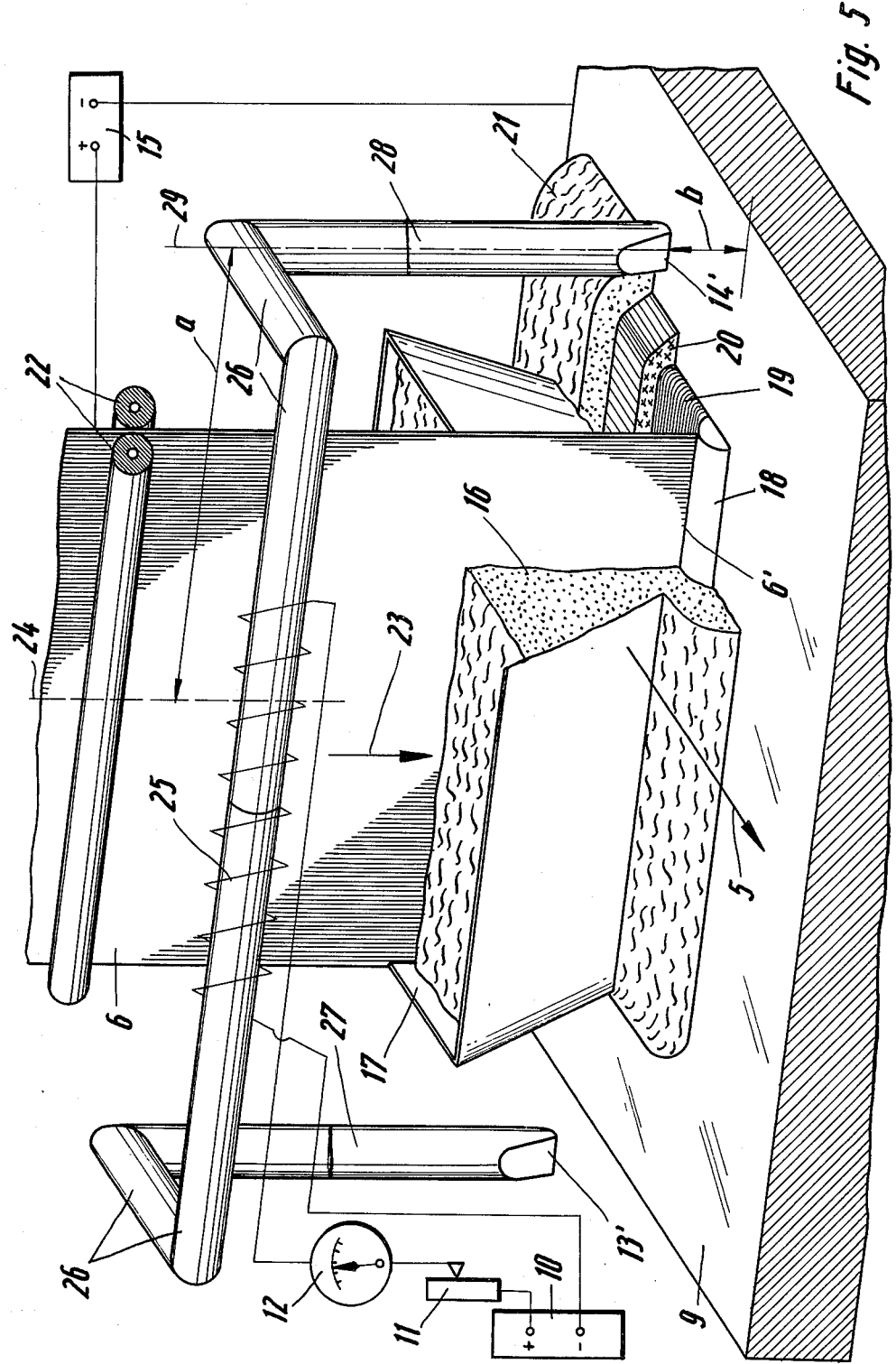

METHOD OF AND APPARATUS FOR THE SUBMERGED ARC SURFACING OF METALLIC WORK PIECES

The invention relates to a method of and an apparatus for submerged arc overlay welding of metallic work pieces with metal strips melting in an electric arc while forming welding beads of more than 75 mm, preferably more than 100 mm width, particularly with strips of alloyed or unalloyed steel.

Submerged-arc welding with strip electrodes is used primarily for the cladding of unalloyed or low-alloy steel with a corrosion-resistant or hard metallic layer. For example, strips of austenitic Cr-Ni steel, nickel alloys or bronze or medium — to high — alloyed wear-resistant steel or cobalt alloys are used as the filler material. It was found that the most favorable thickness of the strip for the process is 0.5 mm and in some cases up to 1 mm. The strip width most frequently used in practice is 30 to 60 mm.

The composition of the filler material and that of the base material differ greatly in most cases so that it is desirable that the penetration or the dilution of the electrode weld deposit with the base material is as low as possible. Tests showed that the penetration increases greatly as the weld speed increases. Therefore in submerged-arc welding with a strip electrode it is not possible substantially to increase the cladding efficiency by increasing the weld speed. For this reason the weld speed must be kept fairly low and normally it is only 9 to 11 cm per minute.

Many attempts were made to increase the cladding efficiency of submerged-arc welding with a strip electrode by using strips wider than 60 mm as the filler material. However, as the width of the strip increases the surface and primarily the edges of the weld beads deteriorate. The bead edges thus produced are steep and irregular. Therefore it is impossible to obtain flawless claddings since there are marked recesses and slag inclusions at the transition between two weld beads.

In order to overcome this drawback, tests were carried out to improve the edges of the weld beads with the aid of especially adjusted welding powders having a powder density of 0.4 to 0.8 kg per litre. However, the width of the strip electrodes with which satisfactory weld beads are still obtained could not be substantially increased in this manner.

It is a known fact that in submerged-arc welding with strip electrodes the arc alternately burns at different points of the end of the strip electrode and thus melts it off. Therefore, attempts were also made to render the motion of said arc uniform by guiding it through an alternating magnetic field directed to the entire melting range of the strip electrode, the lines of force of said alternating magnetic field being perpendicular with respect to the molten edge of the strip. It was hoped to thus render the penetration of the base material more uniform and thus make it possible to use wider strips. However, these expectations materialized either not at all or only to a minor extent. This is probably due to the fact that even without the influence exerted by an alternating magnetic field at times two arcs burn simultaneously in the case of a strip electrode of 60 mm width. It was found that the number of arcs increases as the strip width increases. This necessarily results in a certain uniformity of the melting process over the entire strip width. The use of an alternating megnetic field obviously has the result that the formation of several arcs is prevented so that as the strip width increases the result of successfully influencing the arc in this manner decreases more and more.

A process with a stationary magnetic field transverse to the welding direction is also known. In said process a rotating cylindrical base is welded on with strip electrodes having a maximum width of 75 mm. The coils of the electromagnet are wound around the base material so that said material assumes the function of a magnet core. This method is intended primarily for smoothing the surface of the weld beads. Moreover, for the cladding of plane work pieces it has been proposed that a magnetic field be used which is produced by a magnet coil wound around the strip electrode. However, it must be emphasized that, fundamentally speaking, strips of more than 75 mm width cannot be welded by means of this process.

It is the main object of this invention to provide a process by means of which satisfactory weld beads which are suitable for cladding and have a width of more than 75 mm, preferably more than 100 mm, can be produced by welding corresponding strips of alloyed or unalloyed steel.

Surprisingly it was found that according to the invention this problem can be solved in that during the melting process the strip electrode, which is connected to the pole of a direct current source, is accompanied by a stationary magnetic field by means of which, in the region of the edge zones (each of which is approximately one-twentieth to one-fourth of the strip electrode width), the carriers of positive charges in the arc are deflected toward the direction of welding travel so as to slope outwards, so that the width of the surfacing layer is increased by 2 to 15 mm, preferably by 2 to 8 mm, as compared with the bead width obtained with no influence by the magnetic field.

Thus, the stationary magnetic field influencing the edge zones of the strip electrode has the function of so deflecting the carriers of positive charge toward the direction of welding travel that they slope outwards. Therefore, the direction of deflection and the direction of welding travel must make an angle with one another. In order to define the direction of deflection, it can be assumed that the charge carriers are deflected in a plane which is defined by two imaginary straight lines, one representing the path of the charge carrier with no influence exerted by the magnetic field and the other representing its path under the influence of the magnetic field. These two imaginary straight lines form a plane which intersects the surface of the base material. This line of intersection directly indicates the direction of deflection, which forms an angle with the direction of welding travel. Of course, in practice the charge carriers do not move along a straight line. However, this can be disregarded for the definition of the direction of deflection.

As an approximate value for the angle of deflection it should be noted that this angle should be between approximately 15° and 75° since if the angle of deflection is too large, then the surfacing layer will have a saddle-shaped cross section and if it is too small, then unsatisfactory and irregular edge zones are obtained which frequently are contaminated with slag inclusions and thus result in gusset flaws in overlapping welding beads.

However, in order to dispense with the angle of deflection, which is difficult to determine, the increase in the bead width, which is between 2 and 15 mm, preferably between 2 and 8 mm for the corresponding angle of deflection, was chosen as the criterion of influencing the magnetic field in accordance with the invention. It must be emphasized that the increase in the bead width to the extent defined is not the prime feature, but the process according to the invention per se is important, since it permits the use of extremely wide strip electrodes preferably of far more than 100 mm width while forming weld beads of possibly up to 200 mm width for cladding by weld deposition.

The direction of deflection of the charge carriers in the arc depends substantially on the path of the lines of force of the magnetic field influencing the edges zones of the strip electrode. Said magnetic field can be produced by two magnet poles accompanying the strip edges, the magnet poles being arranged corresponding to the strip electrodes. The same distance of the magnet poles from the edges of the strip electrode, the height of the polar surfaces above the surface of the working piece, and the shape of the polar surfaces are important in this connection.

The intensity of the deflection, i.e. the length of the path which the charge carriers travel owing to the magnetic field, depends on the magnetic field intensity under otherwise identical conditions with respect to particle size, particle velocity and intensity of the electric charge of said particles. The greater the field intensity the longer will be the path travelled by a particle. The simplest way of adjusting the required magnetic field intensity is by changing the intensity of the magnetizing current when using electromagnets for the production of magnetic fields.

According to the invention, regardless of the width of the strip electrode used as compared with the bead width with no influence exerted by the magnetic field, the width of the surfacing layer is to be increased by 2 to 15 mm due to the deflection of the positive charge carriers by the magnetic field. At a strip width of e.g. 80 mm the width of the surfacing layer suitably is 82 to 84 mm if the bead width with no influence exerted by the magnetic field also is 80 mm because of the welding conditions chosen. For greater strip widths it may be necessary to operate with increases in width of 10 to 15 mm. Since the requirements of cladding depend primarily on its purpose, according to a further feature of the invention the influence of the magnetic field is so determined that level differences between the bead edges (as measured from their highest point) and the bead center do not exceed a maximum of 1 mm for austenitic overlay welding, and a maximum of 2 mm for hard surfacing.

The apparatus for carrying out the process according to the invention is characterized in that a magnetic field is provided which is formed by an electromagnet system and the intensity of which is adjustable. The end faces of the magnet cores which form opposite poles are arranged in the edge zone of the melt-off dege of the strip electrode at equal distances from the center axis of the strip on the one hand and from the surface of the work piece on the other.

It is preferable that at least the magnet core ends facing the surface of the workpiece are in alignment with the strip electrode and that their axes are substantially perpendicular with respect to the surface of the workpiece.

According to further features of the invention the ends of the magnet cores facing the workpiece surface can be hemispherical or preferably substantially V-shaped and the included angle thus formed is 20° to 90°, preferably 20° to 50°, the sloping surfaces of the two core ends being substantially in alignment.

It is preferred to construct the apparatus according to the invention in such a manner that the magnet core ends facing the surface of the workpiece are arranged adjustable with respect to their distances from the workpiece surface and from the center axis of the strip electrode. According to a special embodiment of the apparatus according to the invention the magnet core ends are connected to one another by a part which encompasses the strip electrode like a clamp. Thus, the formation of the opposite magnet poles can be brought about by a single magnet coil provided in the connecting part.

In this case too it is favorable if for the adaption or adjusment of the distances of the magnet core ends from the workpiece surface and from the center axis of the strip electrode, the connecting part is constructed as being multipart and adjustable.

The invention is explained hereafter in more detail by means of various practical examples and with reference to the drawings.

Figure 2:
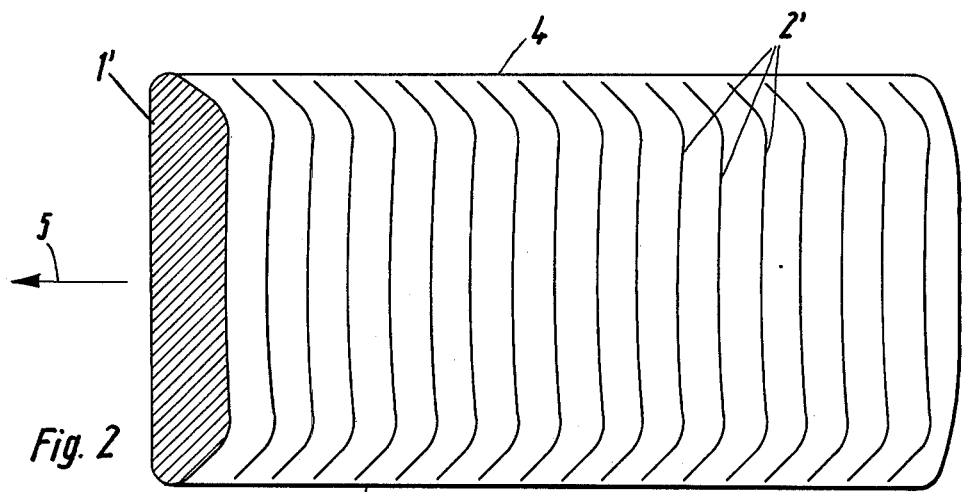
Figure 3:
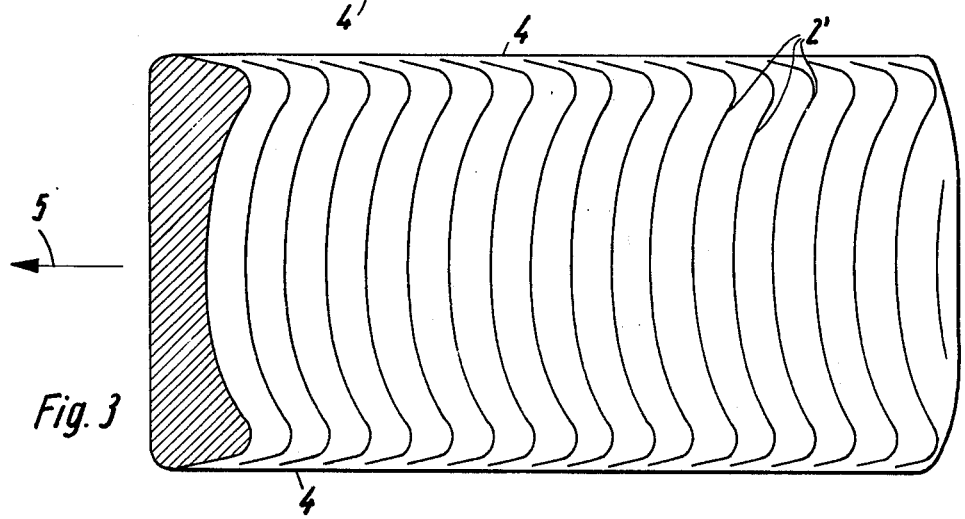
Figure 4:
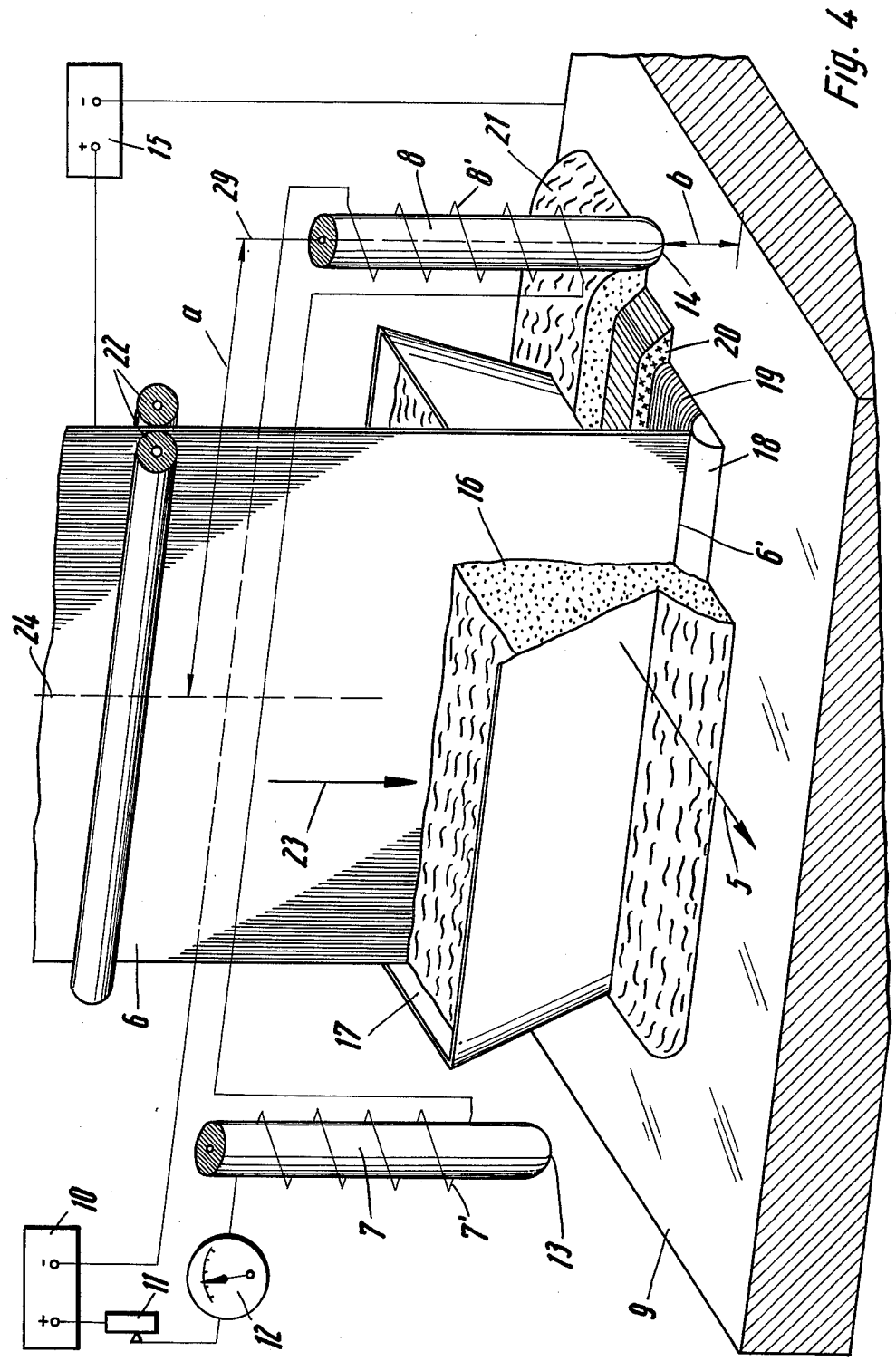

In the Drawings:

FIGS. 1—3, incl, are views in plan of weld beads for cladding purposes, and respective beads having been formed under different conditions;

FIG. 4 is a somewhat simplified fragmentary view in perspective of a first illustrative embodiment of welding apparatus in accordance with the invention, some of the appurtenant devices employed therewith being shown schematically; and FIG. 5 is a view similar to FIG. 4 of a second illustrative embodiment of welding apparatus in accordance with the invention.

The weld beads shown in FIGS. 1—3 were obtained with an austenitic strip electrode of 150 mm width with weld crater formation which is characteristic of the influence of the magnetic field under various angles of deflection. FIG. 1 shows the appearance of a weld bead for cladding which has an end crater 1 shaped like a circular arch and has an analogous featherlike surface 2, the edges of which are steep and irregular. Said end crater 1 was caused by too low a magnetic field effect, thus causing an angle of deflection which was too small. The welding direction is indicated by an arrow 5.

FIG. 2 shows the magnetic field effect arranged and measured according to the invention; the weld bead in this case is characterized by a flat and uniform formation of the weld crater 1', by a feathered surface 2' extending to the edges almost like a straight line and by flat and almost completely straight-lined bead edges 4. As in FIGS. 1 and 3, the welding direction is indicated by an arrow 5.

A further example of a weld bead is shown in FIG. 3. Because of too large an angle of deflection and a corresponding overestimating of the magnetic field effect, a weld crater 1'' of hump-like shape is formed which is caused by the saddle formation at the bead edges. This hump-like shape is also evident from the feathered surface 2''. In this case the edges 4 actually are very flat and straight-lined. However, because of the marked saddle formation at the bead edges and the resulting too great level difference between bead center and bead edges, the welding result actually is not suitable for cladding purposes.

FIG. 4 shows a first embodiment of the welding apparatus according to the invention. In such apparatus the strip electrode 6 is moved in the welding direction 5 over the surface of the workpiece to be clad. During the weld surfacing operation said strip electrode 6 is moved in unison with two electromagnets 7 and 8, which are arranged near the strip edges in alignment with the strip electrode. The magnetizing current, which origniates from a direct-current source 10 and is adjustable by a resistor 11 can be read on the measuring instrument (ammeter) 12, flows in the opposite direction through the magnetizing coils 7' and 8' on the magnet cores 7 and 8, so that a north pole is formed on the hemispherical polar surface 13 of core 7 and a south pole is formed on the analogous polar surface 14 of core 8. The strip electrode 6 is connected to the positive pole of a welding rectifier 15 while the negative pole of this rectifier is connected to the workpiece 9. The lower end of the strip electrode 6 is encompassed by a funnel 17 filled with a welding powder 16. Several arcs in the melt-off zone 18 are ignited by the voltage applied. The arcs cause the lower edge 6' of the strip electrode 6 to melt. The melted-off metal forms a cladding layer 19 on the workpiece. Said cladding layer is covered by a slag layer 20, which is covered in turn by a layer of unmelted welding powder 21. During the melt-off process the strip electrode 6 is continuously fed downwardly in the direction of the arrow 23 by feed rolls 22. The adjustable distance between the magnet cores 7 and 8 (as measured from their center axis 29) from the center axis 24 of the strip electrode 6 is designated $a$ and that of the lower ends 13 and 14 of the cores 7 and 8 from the upper surface of the workpiece 9 is designated $b$.

Another embodiment of the apparatus of the invention is shown in FIG. 5. During the welding operation the strip electrode 6 is moved in the welding direction 5 in unison with an electromagnet system formed by the parts 25 to 28, over the workpiece 9 to be clad. The magnet core ends or legs 27 and 28 are connected to one another by a U-shaped part 26, which encompasses and is spaced from the strip electrode 6 and which is multi-part and adjustable in length in the horizontal central portion as by having the confronting ends of the part 26 of the core telescopically connected. The opposite magnet poles on the chisel-shaped faces 13' and 14' of the lower ends of legs 27 and 28, respectively, are energized by a single transverse magnet coil 25, which is wound around the part 26 of the core. The magnetizing current, which is supplied by a direct-current source 10 and is adjustable by the resistor 11, can be read on the measuring instrument 12, flows through the magnet coil 25 so that a north pole is formed on the polar surface 13' and a south pole on the polar surface 14'. The magnet core ends 27 and 28 are so arranged that the faces 13' and 14' are in alignment with one another in a vertical plane parallel to the electrode 6. They are V-shaped with a flat point, each face forming an included angle on the order of 35° relative to the vertical axis of the corresponding core ends 27, 28.

It should be noted that in the device according to FIG. 5 the magnetizing current source 10 may be dispensed with if desired, since the self-induced field of the welding current acts upon the portion 26 of the core and thus permits the formation of a field by induction, the effect of which can be adjusted by changing the distances between the legs 27, 28 of the core. Moreover, it should be emphasized that the relative motion which, in weld cladding, is necessary between the workpiece and the strip electrode to be melted off and can also be attained by fixing the strip electrode and the electromagnet system and moving the base material, as is usual particularly in the lining of tanks, reactors or the like.

PRACTICAL EXAMPLES

As is evident from Table 2 hereinafter, a number of weld tests were carried out with the apparatus shown in FIG. 5. A magnetizing coil having 9000 windings and magnet core ends of 18 mm diameter were used. A 70 mm sheet of unalloyed steel (0.18% of C, 0.27% of Si, 0.49% of Mn and the rest primarily Fe) served as the base material. The welding powders used had the following compositions:

TABLE 1

| ingredients | welding powder A | welding powder B |
| --- | --- | --- |
| $SiO_2$ | 28.5 % | 42.2 % |
| $Al_2O_3$ | 3.0 % | 1.2 % |
| CaO | 27.3 % | 21.4 % |
| MgO | 1.1 % | 6.2 % |
| $ZrO_2$ | 6.3 % | — |
| $CaF_2$ | 21.2 % | 8.1 % |
| MnO | 1.2 % | 18.5 % |
| FeO | — | 1.2 % |
| $Na_2O$ | 3.5 % | not determined |
| $K_2O$ | 0.7 % | not determined |
| Mn | 2.5 % | — |
| Cr | 2.5 % | — |
| Ni | 0.2 % | — |

Table 2

| No. | Strip Electrode | Welding Powder | Welding Data | Core Distances Magnetizing Current | Metal Deposit |
| --- | --- | --- | --- | --- | --- |
| 1 | analysis: 0.012% C, 21.7% Cr, 11.2% Ni size: 80 × 0.5 mm | A | amperage: 800A voltage: 29V weld speed: 10 cm/min. | a = 80 mm b = 15 mm 0.20A | bead width: 83 mm bead height: 4.8 mm analysis: 0.027 % C 19.27% Cr 10.00% Ni penetration: 10.7% |
| 2 | analysis: 0.012% C, 21.7% Cr, 11.2% Ni size: 120 × 0.5 mm | A | amperage: 1150A voltage: 29V weld speed: 10 cm/min. | a = 100 mm b = 20 mm 0.25A | bead width: 125 mm bead height: 4.9 mm analysis: 0.029% C 19.44% Cr 10.07% Ni penetration: 10.0% |

Table 2 —Continued

| No. | Strip Electrode | Welding Powder | Welding Data | Core Distances Magnetizing Current | Metal Deposit |
|---|---|---|---|---|---|
| 3 | analysis 0.019% C, 20.4% Cr, 11.9% Ni, 0.85% Nb size: 150 × 0.5 mm | A | amperage: 1450A voltage: 29V weld speed: 10 cm/min. | a = 120 mm b = 20 mm 0.30A | bead width: 156 mm bead height: 4.7 mm analysis: 0.033% C, 19.4% Cr, 9.9% Ni, 0.67 % Nb penetration: 9.7% |
| 4 | analysis 0.019% C, 21.1% Cr, 11.0% Ni size: 180 × 5 mm | A | amperage: 1800A voltage: 29V weld speed: 10 cm/min. | a = 135 mm b 2 15 mm 0.35A | bead width: 186 mm bead height: 5.0 mm analysis: 0.029%C, 18.9% Cr, 9.9% Ni penetration: 9.5% |
| 5 | analysis: 0.27% C, 6.6% Cr 1.6% Mo, 1.6% W size: 180 × 0.5 mm | B | amperage: 2050A voltage: 30V weld speed: 10 cm/min. | a = 135 mm b = 15 mm 0.15A | bead width: 190 mm bead height: 5.0 mm analysis: 0.21% C, 4.5% Cr, 1.3 Mo, 1.3% W |

Insofar as the analyses of strip electrode and metal deposit listed in Table 2 are concerned, it should be noted that they comprise only the alloying elements important for the result of welding. Apart from contents of a maximum of 1 percent of Si and a maximum of 2 percent Mn, the remainder always consists of iron, disregarding unavoidable impurities.

Although the invention is illustrated and described with reference to a plurality of preferred embodiments thereof, it is to be expressly understood that it is in no way limited to the disclosure of such a plurality of preferred embodiments, but is capable of numerous modificatins within the scope of the appended claims.

What is claimed is:

1. Apparatus for the submerged arc surfacing of metallic work pieces with metal electrode strips melting in an electric arc while forming welding beads of more tha 75 mm width, comprising a work piece, an electrode strip, means operative to move said electrode strip and work piece relative to each other, a direct current source, means for connecting to opposite poles of said source the electrode strip and the work piece, respectively, electromagnetic means producing a stationary magnetic field and having a pair of end faces of opposite polarity operatively mounted at opposite sides of electrode strip, means for adjusting the intensity of said electromagnetic means, said end faces of opposite polarity being arranged in the edge zone of the melt-off edge of the strip electrode at equal distances from the center axis of the strip, the electromagnetic means being disposed at equal distances from the surface of the work piece.

2. Apparatus according to claim 1, wherein the end faces of said electromagnetic means facing the surface of the work piece are in alignment with the strip electrode and wherein their axes substantially perpendicular to the work piece surface being clad.

3. Apparatus according to claim 2, wherein said electro-magnetic means are formed as a pair of magnetic cores and the end faces of the magnetic cores which face the work piece surface to be clad are hemispherical.

4. Apparatus according to claim 3, wherein the end faces of the magnetic cores which face the work piece surface to be clad are substantially V-shaped, the included angle thus formed being 20° to 90°, and the end faces of the magnetic cores are substantially in transverse alignment.

5. Apparatus according to claim 3, comprising means for adjusting the magnetic core ends facing the work piece surface to be clad with respect to their distances from the said work piece surface and from the center axis of the strip electrode.

6. Apparatus according to claim 3, comprising a U-shaped core part connecting the magnetic core ends, the U-shaped part encompassing the strip electrode, and a magnetic coil provided about the connecting part.

7. Apparatus according to claim 6, wherein the U-shaped connecting part is constructed as being multipart and adjustable, whereby to permit the adjustment of the distance of the magnetic cores from the surface of the work piece to be clad and from the center axis of the strip electrode.

* * * * *